(12) United States Patent
Tengler et al.

(10) Patent No.: US 7,363,117 B2
(45) Date of Patent: Apr. 22, 2008

(54) METHOD AND SYSTEM FOR COMMUNICATION BETWEEN VEHICLES TRAVELING ALONG A SIMILAR PATH

(75) Inventors: Steve Tengler, Grosse Pointe Park, MI (US); Takeshi Mitamura, West Bloomfield, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 716 days.

(21) Appl. No.: 10/813,440

(22) Filed: Mar. 31, 2004

(65) Prior Publication Data

US 2005/0222716 A1 Oct. 6, 2005

(51) Int. Cl.
*H04Q 7/20* (2006.01)
*G08G 1/123* (2006.01)
*G06F 165/00* (2006.01)

(52) U.S. Cl. .............. 701/1; 701/96; 701/301; 455/41.2; 340/903

(58) Field of Classification Search .......... 701/1, 701/93, 96, 205, 300, 301; 340/435, 903; 455/414.2, 426.2, 41.2, 96; 707/10
See application file for complete search history.

(56) References Cited

U.S. PATENT DOCUMENTS

| | | | |
|---|---|---|---|
| 5,428,544 A * | 6/1995 | Shyu | ................. 701/117 |
| 6,166,649 A | 12/2000 | Inoue | |
| 6,175,791 B1 | 1/2001 | Oouchi | |
| 6,181,023 B1 | 1/2001 | Inoue | |
| 6,337,622 B1 | 1/2002 | Sugano | |
| 6,356,207 B1 | 3/2002 | Oouchi | |
| 6,516,285 B1 | 2/2003 | Hori et al. | |
| 6,650,252 B2 * | 11/2003 | Miller, Jr. | ................. 340/989 |
| 6,788,964 B1 * | 9/2004 | Satomura et al. | ........ 455/575.9 |
| 7,046,168 B2 * | 5/2006 | Tsuboi | ................. 340/903 |
| 2001/0024948 A1 | 9/2001 | Yamashita | |
| 2002/0040270 A1 | 4/2002 | Kwak et al. | |
| 2002/0066055 A1 | 5/2002 | Kim | |
| 2002/0072365 A1 | 6/2002 | Choi | |
| 2002/0072964 A1 | 6/2002 | Choi | |
| 2002/0080048 A1 | 6/2002 | Choi | |
| 2002/0198643 A1 | 12/2002 | Lee | |
| 2003/0011494 A1 | 1/2003 | Reider et al. | |
| 2003/0120826 A1 | 6/2003 | Shay | |
| 2003/0129952 A1 | 7/2003 | Inoue | |
| 2003/0186675 A1 * | 10/2003 | Davis et al. | ................. 455/403 |
| 2004/0236499 A1 * | 11/2004 | Watanabe | ................. 701/200 |
| 2005/0003844 A1 * | 1/2005 | Nishiga et al. | ............. 455/517 |

* cited by examiner

*Primary Examiner*—Tan Q. Nguyen
(74) *Attorney, Agent, or Firm*—Foley & Lardner LLP

(57) ABSTRACT

A method and system of communicating with other vehicles includes determining, by a first vehicle, whether other vehicles are within short range communication range of the first vehicle. A first vehicle, filters the other vehicles within short range communication range based on whether the other vehicles are traveling along a same or similar path, and establishes communication with one or more of the other vehicles based on the filtering.

27 Claims, 13 Drawing Sheets

METHOD AND SYSTEM FOR COMMUNICATION BETWEEN VEHICLES TRAVELING ALONG A SIMILAR PATH

BACKGROUND OF THE INVENTION

Vehicle based navigational systems are known that detect, map, and track a map matching location of a vehicle installed with a navigational system (for example, a vehicle with an installed GPS based navigational system). This map matching information is useful and is widely used for finding directions to specific destinations and also to navigate the vehicle to the specific destination. However, when two or more vehicles are traveling in proximity to each other for at least some segment of travel, these known navigational systems do not provide a mechanism for effective communication between the vehicles.

SUMMARY OF THE INVENTION

One embodiment of the invention described herein provides a method of automatically communicating with other vehicles, including: determining, by a first vehicle, whether other vehicles are within short range communication range of the first vehicle; filtering, by the first vehicle, of the other vehicles within short range communication range based on whether the other vehicles are traveling along a same path; and establishing communication with one or more of the other vehicles based on the filtering in the filtering step.

In one embodiment, the determining step includes determining other vehicles which are within range of Dedicated Shortwave Radio Communications (DSRC) communication for a period of time.

In another embodiment, the filtering step includes determining other vehicles which have a similar travel vector as the first vehicle.

In one embodiment, the determining step includes determining other vehicles which are within DSRC communication range on a moving basis based on a moving position of the first vehicle.

In another embodiment, the determining step includes determining other vehicles which also have their ignition key in an on position.

In one embodiment, the step of establishing communication includes sending and receiving information at the first vehicle to/from one or more of the other vehicles. The information may include one or more of a map information, game information, audio or video data streams, instant messaging information, or other digital data files.

In another embodiment, the present invention provides a system for automatically communicating with other vehicles, including: a radio communication unit for a first vehicle to communicate with other vehicles which are within the range of the radio communication unit associated with the first vehicle; a positioning determination system for determining a position of the first vehicle; and a control unit for filtering, by the first vehicle, of the other vehicles based on whether the other vehicles are traveling along a same path, wherein the radio communication unit establishes communication with one or more of the other vehicles filtered by the control unit

BRIEF DESCRIPTION OF THE DRAWINGS

The accompanying drawings, which are incorporated in and constitute a part of the specification, illustrate embodiment(s) of the invention, and, together with the general description given above and the detailed description of the embodiment(s) given below, serve to explain the principles of the invention.

DETAILED DESCRIPTION OF THE EMBODIMENTS

Figure 1:
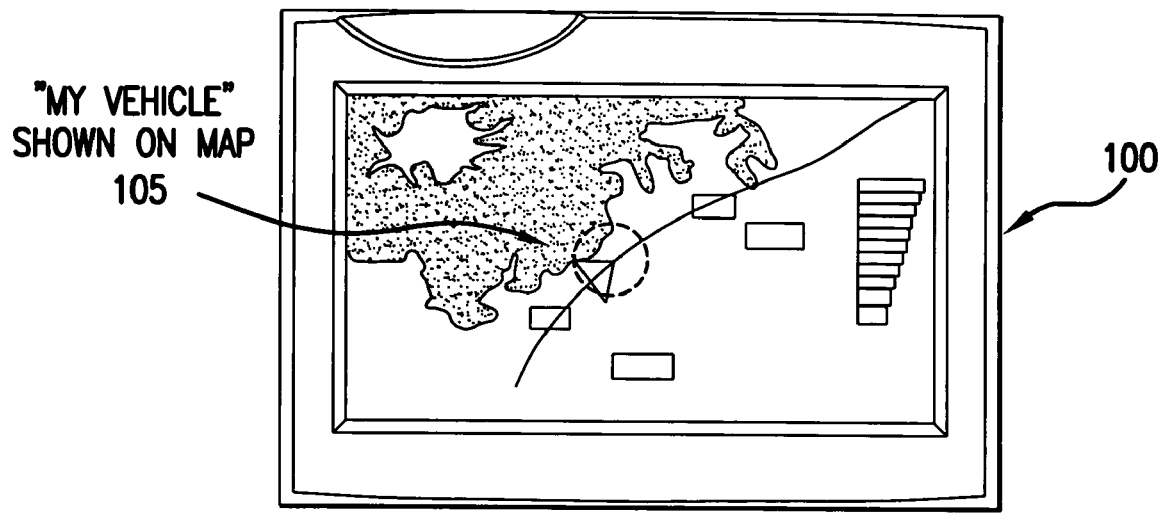
FIG. 1 shows a basic navigational map display in a vehicle.

Certain embodiments of the present invention are described below with reference to drawings. These drawings illustrate certain details of specific embodiments of the systems, methods, and programs of these embodiments. However, describing embodiments of the invention with drawings should not be construed as imposing on the invention any limitations that may be present in the drawings.

Current vehicle navigational and communication systems do not provide the ability for vehicles traveling along a similar travel path to communicate effectively. During a long trip, for example, passengers in such vehicles do not have the ability to effectively share information with passengers in the other vehicles and thereby make the trip a little less tedious for passengers in such vehicles.

Figure 2:
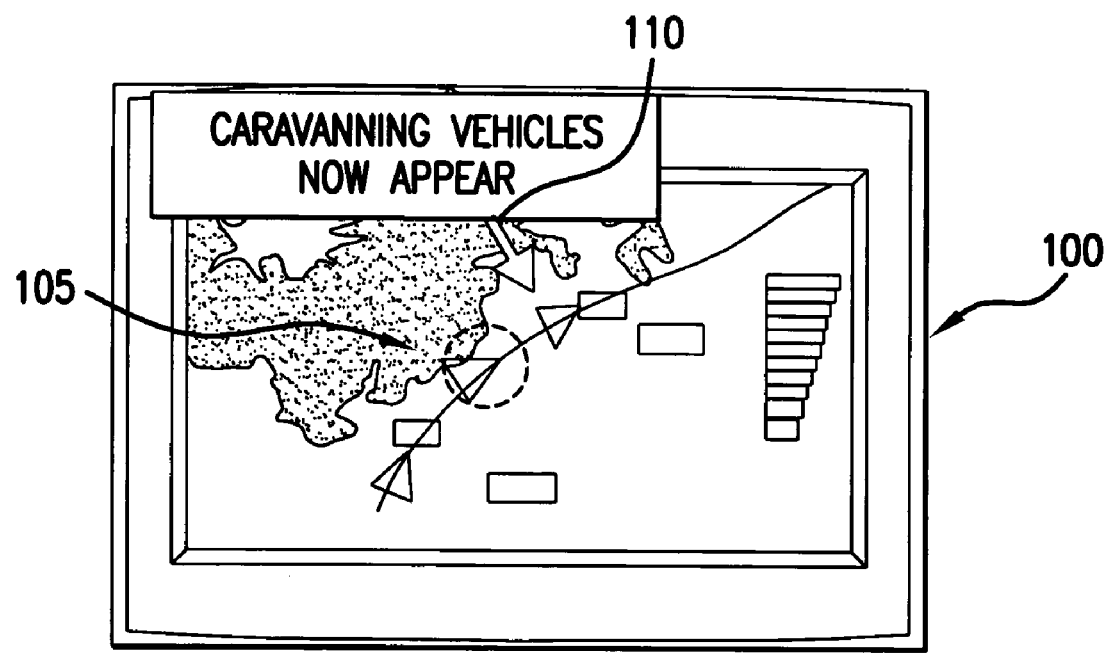
FIG. 2 shows a basic navigational map display in a vehicle in accordance with one embodiment of the present invention.

Therefore, one embodiment of the present invention provides for a link between two or more such vehicles that may be traveling along a similar travel path for at least some duration of time. Such a link may be formed using short range radio communication, for example, using the features of the Dedicated Shortwave Radio Communication (DSRC) which is being rapidly adapted for use in the intelligent transportation systems (ITS). Therefore, as shown in FIG. 1, a basic navigational map display 100 which shows the position 105 of a current vehicle (on which the display is mounted) may advantageously show the position 110 of another vehicle on the same map as shown in FIG. 2. In this way, several vehicles that are traveling together in a convoy or caravan may be able to track each other's position relatively easily in their respective navigational map displays. Furthermore, such vehicles traveling in a similar travel path, for example, in a caravan or convoy, may also be configured so that their rear-seat entertainment (RSE) systems could communicate with each other while the vehicles are traveling along a same travel path.

In particular, one of the applications communicating between the vehicles could include either the transfer of electronic games or the collaborative playing of electronic games with game playing data being reflected on the displays on the screens on both vehicles. It should be understood that while the discussion herein refers to display screens for displaying or communicating information between two vehicles, it is contemplated that other human-machine interfaces (HMI) including, for example, voice activated or joystick based interfaces may also be used as would be recognized by those skilled in the art after reading this disclosure.

Overall, the popularity of online board or card games has been rapidly increasing and crosses all demographic segments. For example, one survey found that such game participants include 29% of frequent internet users. Furthermore, the emergence of broadband wireless technologies, such as 3G, together with sophisticated handsets, color screens, and dynamic sounds have greatly increased the popularity of wireless and collaborative online games. One recent estimate estimated that the number of unique wireless gamers in the U.S. will climb from an estimated 7 million in 2002 to an estimated 71.2 million in 2007. Therefore, the popularity of wireless gaming is clearly experiencing exponential growth and, therefore, its acceptance by vehicle passengers is also likely to be increasing at a rapid rate.

Figure 3:
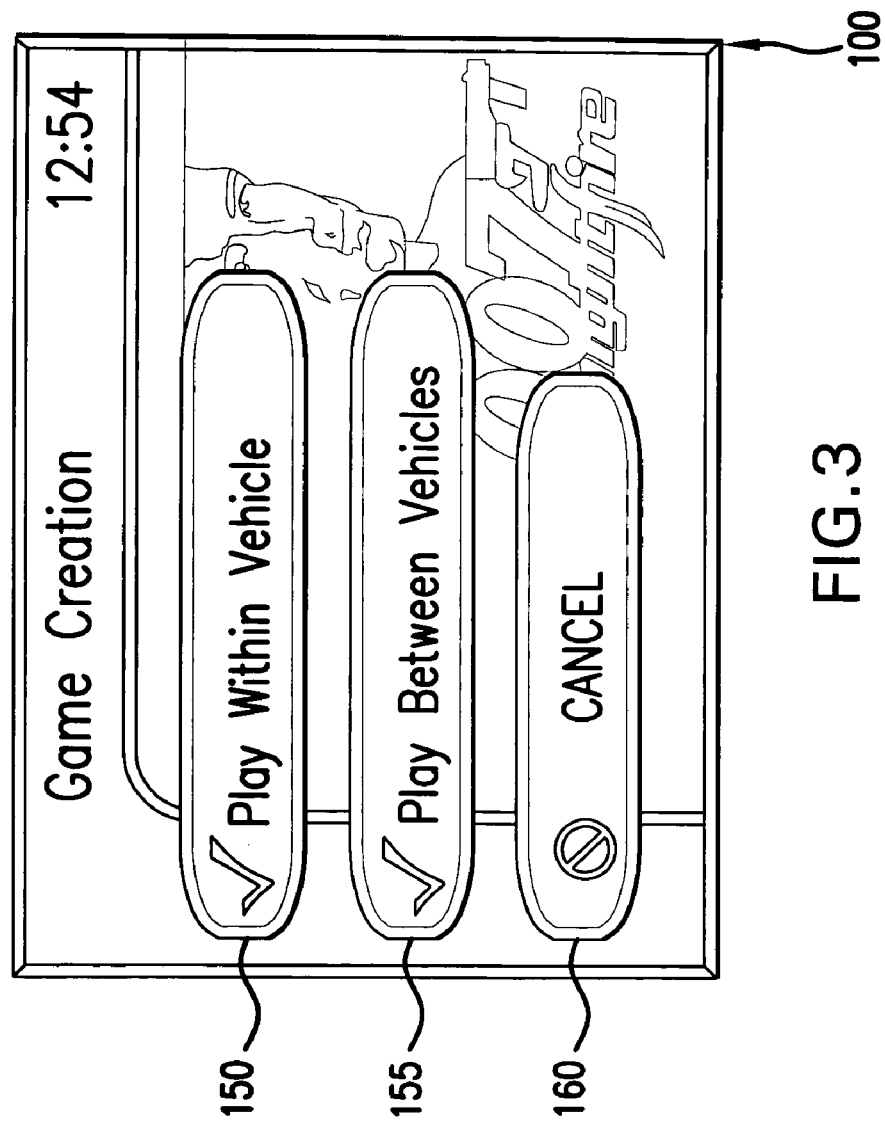
FIG. 3 displays a screen with input options for playing electronic games in a vehicle.

Therefore, as shown in FIG. 3, one embodiment of the present invention provides a display 100 (or other HMI) that allows a passenger in a vehicle the option to play electronic games either within the vehicle or by communicating with another vehicle in accordance with the principles of the present invention. Such a display 100 would include an input 150 for indicating that the passenger would like to play an electronic game within the vehicle, an input 155 for indicating a preference for playing an electronic game between vehicles, and an input 160 for canceling either of the selections. It is to be understood that while the displayed screen discloses a game with the input options 150 and 155 for playing the game either within the vehicle or with one or more other vehicles, other menu arrangements may be provided as would be recognized by one skilled in the art, after reading the teachings of this disclosure. For example, in one embodiment, the passenger may initially select between playing a game within a vehicle or playing a game between vehicles and based on the selection of the passenger, different lists of games may be presented to the passenger. That is, if the passenger selects the input for playing within the vehicle, a first list of games may be displayed for the passenger's selection while if the passenger selects playing a game between vehicles, a second list of games may be displayed to the passenger. Needless to say, some of the games displayed in the first and second list may be the same when these games are easily adapted for playing either within the vehicle or collaboratively between two vehicles. Finally, another option may be presented for downloading a game from another vehicle with which the current vehicle is in communication in accordance with the principles of the present invention as discussed further herein.

FIGS. 4-7 illustrate the principles by which a first vehicle determines which other vehicles are in its communication vicinity and filters these vehicles so that the first vehicle may establish communication with one or more of these vehicles, based on the filtration, that may be traveling along a similar or same path as the first vehicle.

Figure 4:
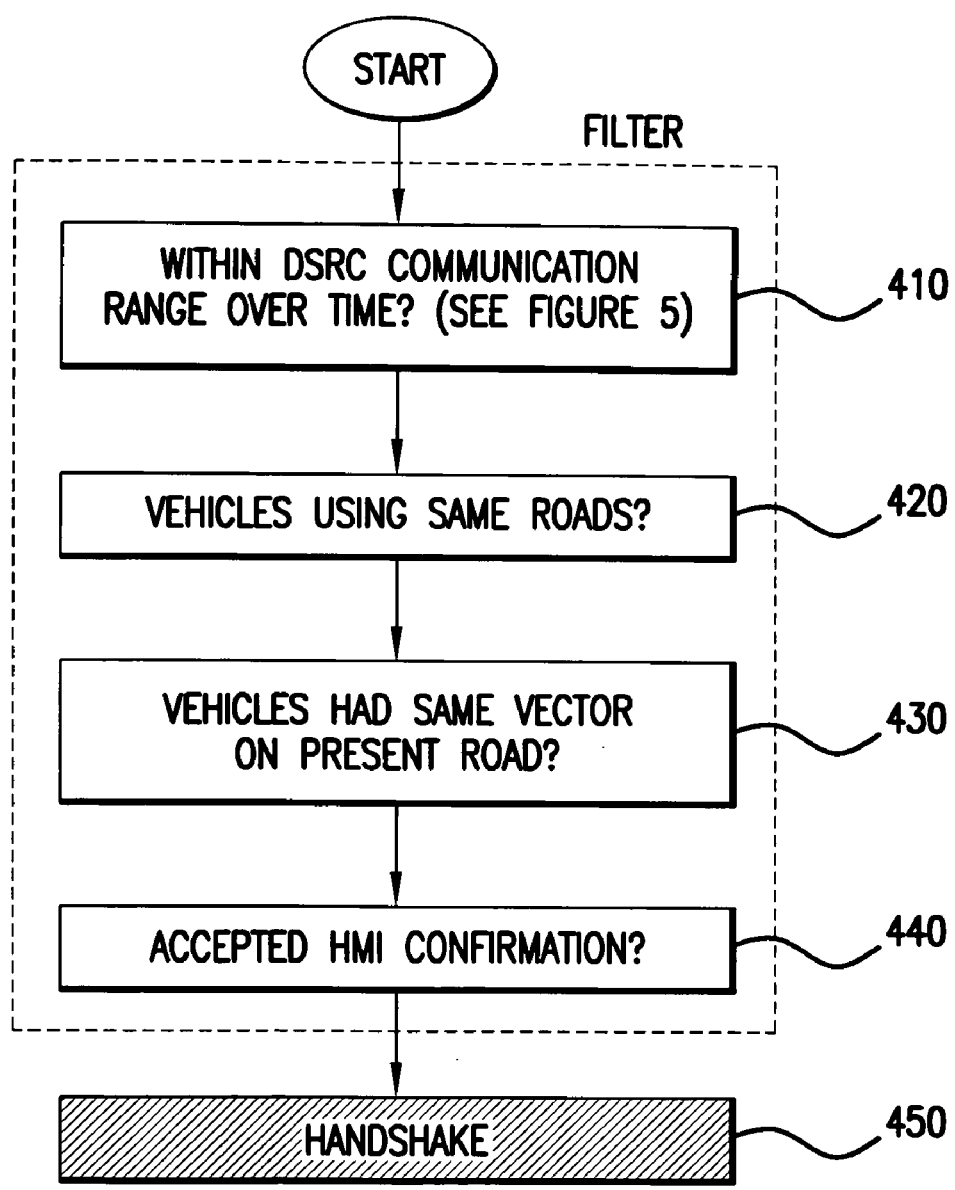
FIG. 4 is a flow chart that illustrates a process for a first vehicle determining which other vehicles it might communicate with in accordance with one embodiment of the present invention.
Figure 5:
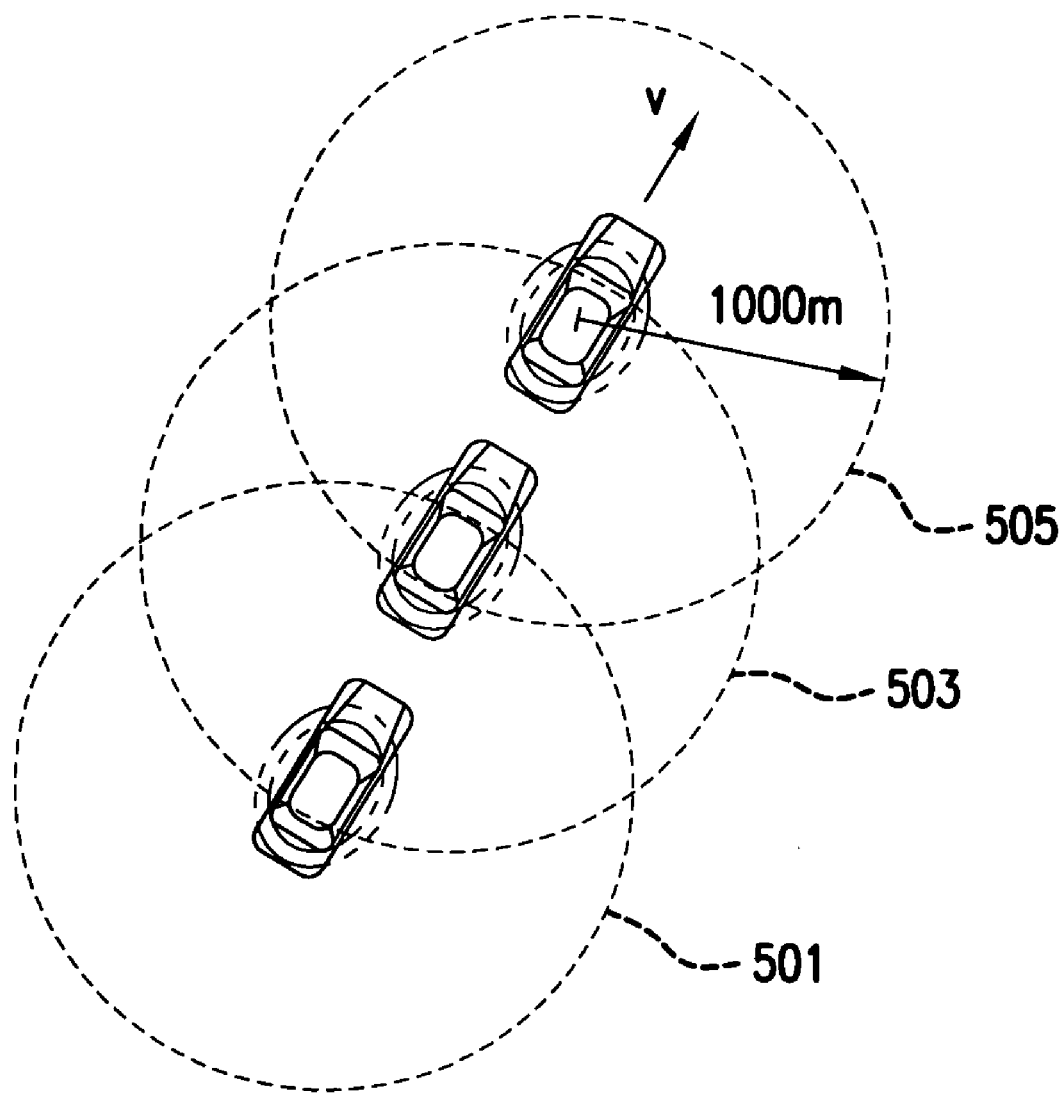
FIG. 5 illustrates how the range for communication shifts with the movement of a vehicle.

FIG. 4 is a flow chart that illustrates a process for a first vehicle determining which other vehicles it might communicate with in accordance with one embodiment of the present invention. In step 410, the first vehicle determines whether any other vehicle is in range for effective radio communication between the two vehicles. For example, in one embodiment, such a range is determined based on a distance between the vehicles that is suitable for DSRC communication between the vehicles. FIG. 5 illustrates how the range for communication shifts from 501 to 503 to 505 as the vehicle moves forward based on an effective exemplary DSRC communication range of 1000 meters. It is to be understood that both the DSRC communication technology and the range of 1000 meters discussed herein are exemplary only and other short range communication technologies (for example, based on PCS) and ranges could also be used by one skilled in the art in accordance with the principles of present invention discussed herein.

As is known to those skilled in the art, DSRC is a communications approach between vehicles and the roadside for a variety of purposes, such as intersection collision avoidance, transit or emergency vehicle priority signals, electronic parking payments, and commercial vehicle clearance and safety inspections. While many current DSRC applications operate in the 902-928 MHz band, a 75 MHz band in the 5.9 GHz range has also been allocated for DSRC communications for intelligent transportation systems (ITS). Therefore, this band could be advantageously used to provide the inter vehicle communication contemplated by embodiments of the present invention.

Therefore, inter vehicle communication can be easily accomplished using DSRC to provide information including GPS location, vehicle speed, and a vehicle's road segment from one vehicle to another. This information can be communicated from an on-board unit (OBU) of one vehicle to an OBU of another vehicle that is in range for radio frequency transmission. Therefore, this information can enable one vehicle to determine all the other vehicles in its vicinity, for example, within a distance of 1000 meters. It is expected that DSRC systems created by different manufacturers will be interoperable based on a standard, such as one that may be created by the Federal Communications Commission (FCC) in 2004 so that OBU's manufactured by different manufacturers will be able to communicate with each other. Furthermore, once the vehicle is able to determine which other vehicles are in its vicinity, it may also establish a DSRC communication link using a handshake protocol and then use the communication link to transfer data between two vehicles each having its own DSRC system. For example, digital packets supporting DVD/CD/MP3 or e-gaming can be sent at a frequency of every 100 ms.

With reference to FIG. 4, after the first vehicle has determined which other vehicles are in its radio communication range in step 410, it determines which of these other vehicles are using the same roads as the first vehicle in step 420. Therefore, as a first filter, only vehicles traveling on the same road (or alternatively connected roads that are connected along a same travel path) are considered since vehicles traveling on different roads or travel paths are unlikely to remain in shortwave radio communication range for any significant length of time.

Thereafter, in step 430, a determination is made as to whether the first vehicle and the vehicles under consideration after the filtration in step 420, have a same or similar travel vector. The travel vector is any construct that represents the travel path of a vehicle and enables the comparison of travel paths of two or more vehicles to determine whether they are traveling along a same or similar travel path.

Figure 6:
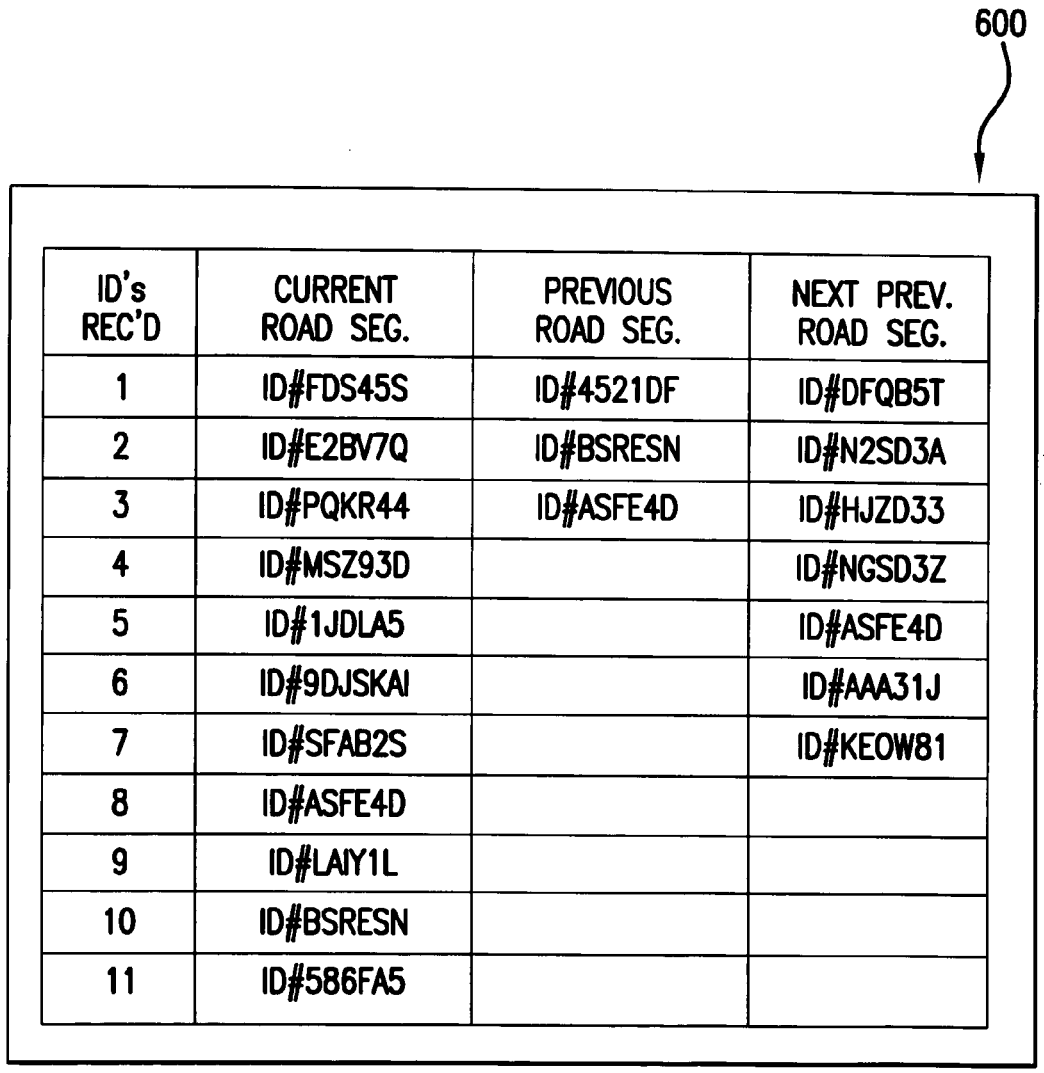
FIG. 6 shows a table that illustrates one implementation of a travel vector.

In one embodiment, FIG. 6 discloses a table 600 that exemplifies one implementation of a travel vector. For each vehicle, the travel vector includes a sequence of a certain number of successive travel segments (for example, roads or segments of roads) traveled by a vehicle. As shown in FIG. 6, each vehicle's travel vector includes the last three successive travel segments traveled by the vehicle. It should be understood that the table 600 represents only one implementation of a travel vector for each vehicle and one skilled in the art would recognize various other alternatives as long as each such travel vector provided an indication of the successive recent travel segments traveled by a vehicle. Therefore, in step 430 in FIG. 4, other vehicles having travel vectors best aligned with that of the first vehicle are selected as candidates for communication with the first vehicle.

Figure 7:
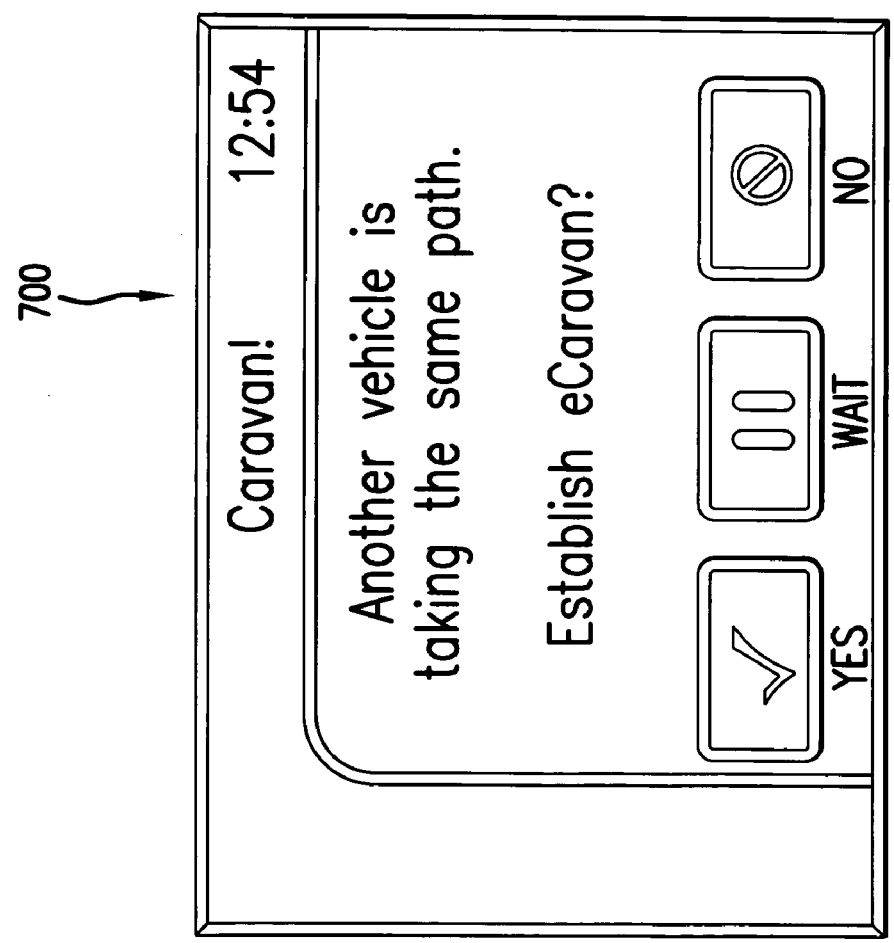
FIG. 7 is a display illustrating an option to establish communication with another vehicle.

FIG. 7 illustrates a display 700 that provides a passenger in the first vehicle an option to establish communication with one or more of the vehicles filtered by step 430 based on having a similar travel vector to that of the first vehicle and presumably traveling along a path similar to that of the first vehicle. If the passenger in the first vehicle chooses to establish communication with one or more of the other vehicle, a confirmation request is sent to the selected other vehicle in step 440 and a handshake communication is established in step 450.

Figure 8:
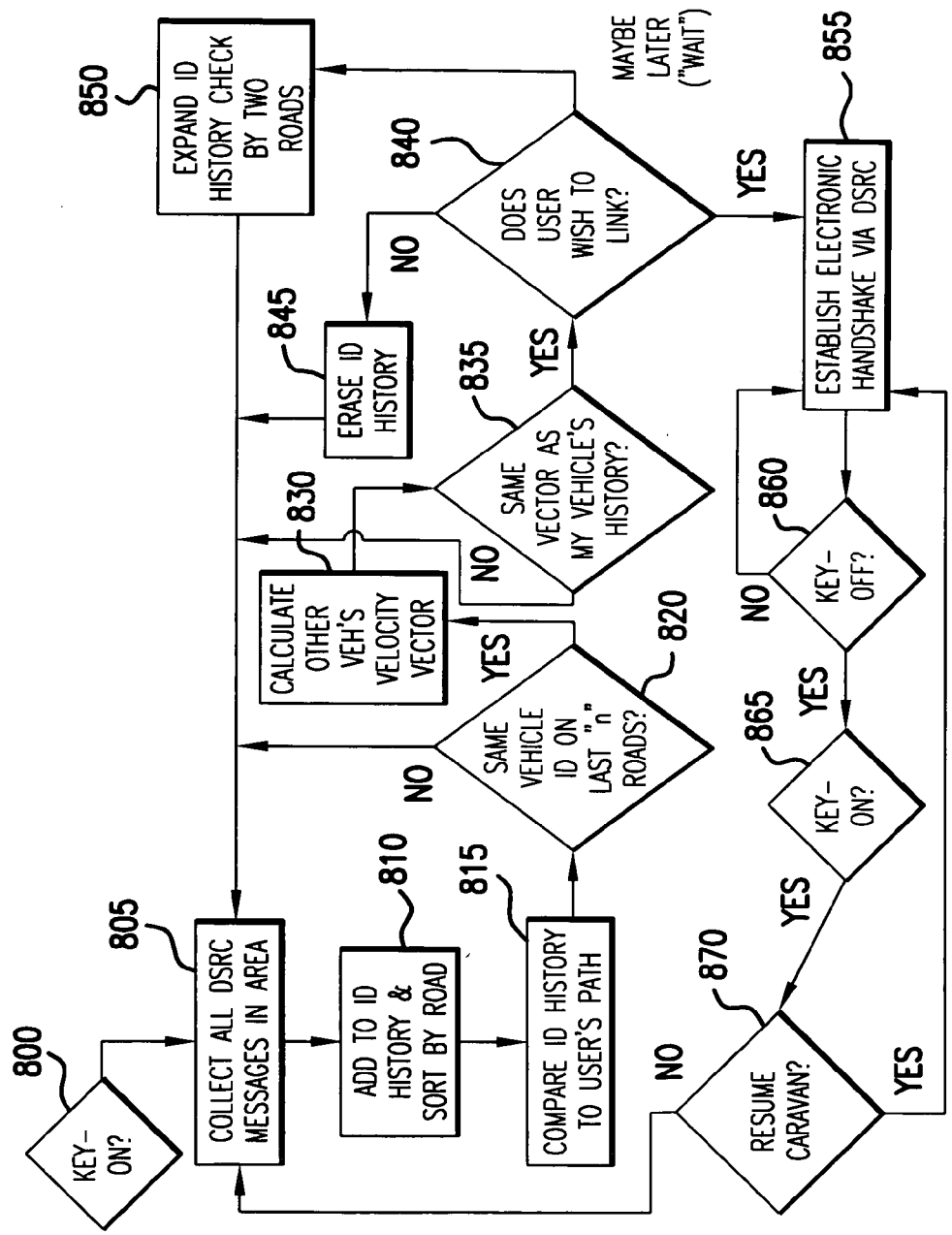
FIG. 8 is flowchart that illustrates one exemplary process flow for establishing inter vehicle communication in accordance with one aspect of the present invention.

FIG. 8 is a flowchart that illustrates one exemplary process flow for establishing automatic inter-vehicle communication in accordance with one embodiment of the present invention. In step 800, the process is initiated whenever an ignition key-on condition is detected in a first vehicle on which a system provided according to one embodiment is installed. Of course, the entire process flow may be repeated at a predetermined frequency once the key-on condition is present. Alternatively, the process flow may be manually initiated by an input provided by a passenger using the human-machine interface in the first vehicle.

In step 805, the first vehicle determines all other vehicles which are within its communication range, for example, using DSRC communication, as discussed earlier herein. In step 810, the information of each of these other vehicles is stored on the OBU of the first vehicle. The information of these other vehicles includes, for example, a unique vehicle ID that identifies each vehicle together with a listing of the last "n" travel segments traveled by the vehicle where "n" may be a reasonable number of travel segments that is indicative of a travel path of a vehicle. In one embodiment, the number "n" of travel segments stored is 3.

In step 815, the process compares the sequence of travel segments traveled by the other vehicles to the sequence of travel segments traveled by the first vehicle to determine in step 820 which of the other vehicles are traveling along a same travel path as the first vehicle. For the other vehicles traveling along the same travel path as the first vehicle, in step 830, the velocity vector of the other vehicles are calculated (i.e., the velocity and direction of the travel of the other vehicles along the travel segments). In step 835, for each vehicle which has a same or similar velocity vector (and travel path) as the first vehicle, a user or passenger in the first vehicle is provided an option to connect to such vehicles in step 840.

In one embodiment, to implement step 835 and determine whether two vehicles have the same travel vector, and for the system to know the vehicles are heading in the same direction rather than opposite directions along the same path, "My Vehicle" would have to establish the prospective vehicle's trajectory (via a multi-point analysis) and compare this vector to "My Vehicle's History" over that same portion of the road. In one embodiment, this could be accomplished through the following formulas:

$$P(x, y) = \frac{1}{n}\Sigma \frac{(y_2 - y_1)}{(x_2 - x_1)} + \frac{(y_3 - y_2)}{(x_3 - x_2)} + \ldots + \frac{(y_n - y_{n-1})}{(x_n - x_{n-1})}$$

where $P(x,y)$=The averaged slope of the prospective vehicle on roadway "z"
x=Prospective vehicle's longitude at time 1, 2, 3 ... n
y=Prospective vehicle's latitude at time 1, 2, 3 ... n
n=Number of points being averaged to determine average slope.

$$M(x, y) = \frac{1}{n}\Sigma \frac{(b_2 - b_1)}{(a_2 - a_1)} + \frac{(b_3 - b_2)}{(a_3 - a_2)} + \ldots + \frac{(b_n - b_{n-1})}{(a_n - a_{n-1})}$$

where $M(a,b)$=The averaged slope of "My Vehicle" on roadway "z"
a=My vehicle's longitude at time 1, 2, 3 ...
b=My vehicle's latitude at time 1, 2, 3 ...
n=Number of points being averaged to determine average slope $$d(t) = ((b_t - y_t)^2 + (a_t - x_t)^2)^{1/2}$$

where $d(t)$=distance between "My Vehicle" and the prospective vehicle at time=t
a,b(t)=My vehicle's longitudinal and latitudinal coordinates at time=t If $d(t)$<"D" meters AND $c1 \times M(a,b) < P(x,y) < c2 \times M(a,b)$ then vehicles are deemed headed in the same direction given that:
D=preset maximum distance between vehicles at handshake
$C_1$=preset minimum slope
$C_2$=preset maximum slope In step 840, the user may decide that he does not wish to connect to the identified vehicle, and in step 845 the ID of such a vehicle is erased or placed in an inactive list. Alternatively, the user may decide that he wishes to establish a link at a later time or after more confirmation of their same or similar travel paths is obtained. Therefore, in step 850, additional travel path segments of the other vehicles is collected by the first vehicle in order to make a later decision as to whether to connect to the other vehicle. For example, if the initial travel path information included information of 3 travel segments, the information of two additional travel segments (that is, 5 in total) may be collected and the determination whether the other vehicle and the first vehicle are traveling along the same travel path may be determined based on a travel or velocity vector which encompasses information corresponding to the five travel segments.

On the other hand, in step 840, the user may decide that he or she wants to establish communication with the other vehicle. Therefore, in step 855, the first vehicle establishes an electronic handshake with the other vehicle, for example, using DSRC communication. Thereafter, the communication established in step 855 is maintained until a key-off or until out of range condition is detected in step 860 which periodically checks for the occurrence of the key-off condition or out of range condition.

At the point of an established electronic handshake, the system could preface all communication packets intended for entertainment systems with the intended vehicular ID's of interest. Upon a Key-Off/Key-On as shown in Step 860, the vehicle could ask the user if he/she would like to reestablish the electronic handshake ("Resume Electronic Caravan") so that the system need not rediscover vehicles in the area. In the event of a safety-related situation identified by the DSRC processor (e.g. forward-crash warning), the handshake would be put on hold while the system switched to the high priority ("control") channel and would reestablish the handshake after the imminent situation was cleared.

In addition, the user may be provided with the option of a manually initiated handshake such that he need not wait for automatic sensing during the route. This may be helpful when a planned rendezvous for the caravan would be a rest stop or other on-highway point of interest which would prevent multiple, smaller maneuvers at the beginning of the route. To facilitate such an initiation, the user must be provided the MAC (Media Access Control) address for his own vehicle, and the ability to either manually enter a known MAC within the caravan or select from the MAC's detected in the local area.

Therefore, as discussed above, if a key-off condition is detected in step 860, a subsequent key-on condition is detected in step 865, which periodically checks to determine whether a key-on condition is present within a certain timeframe after a key-off condition is detected. One skilled in the art would recognize that this timeframe may be determined based on various parameters including, for example, an average stop time during breaks in a journey or this timeframe may be set or overridden by the user.

If the key-on condition within the certain timeframe is detected in step 865, in step 870, the user is given the choice of resuming the communications with the same or another vehicle on a same or similar travel path as the first vehicle. If the user chooses to resume communications in step 870, the control flow proceeds to step 805 and the process flow proceeds as discussed earlier herein.

Figure 9:
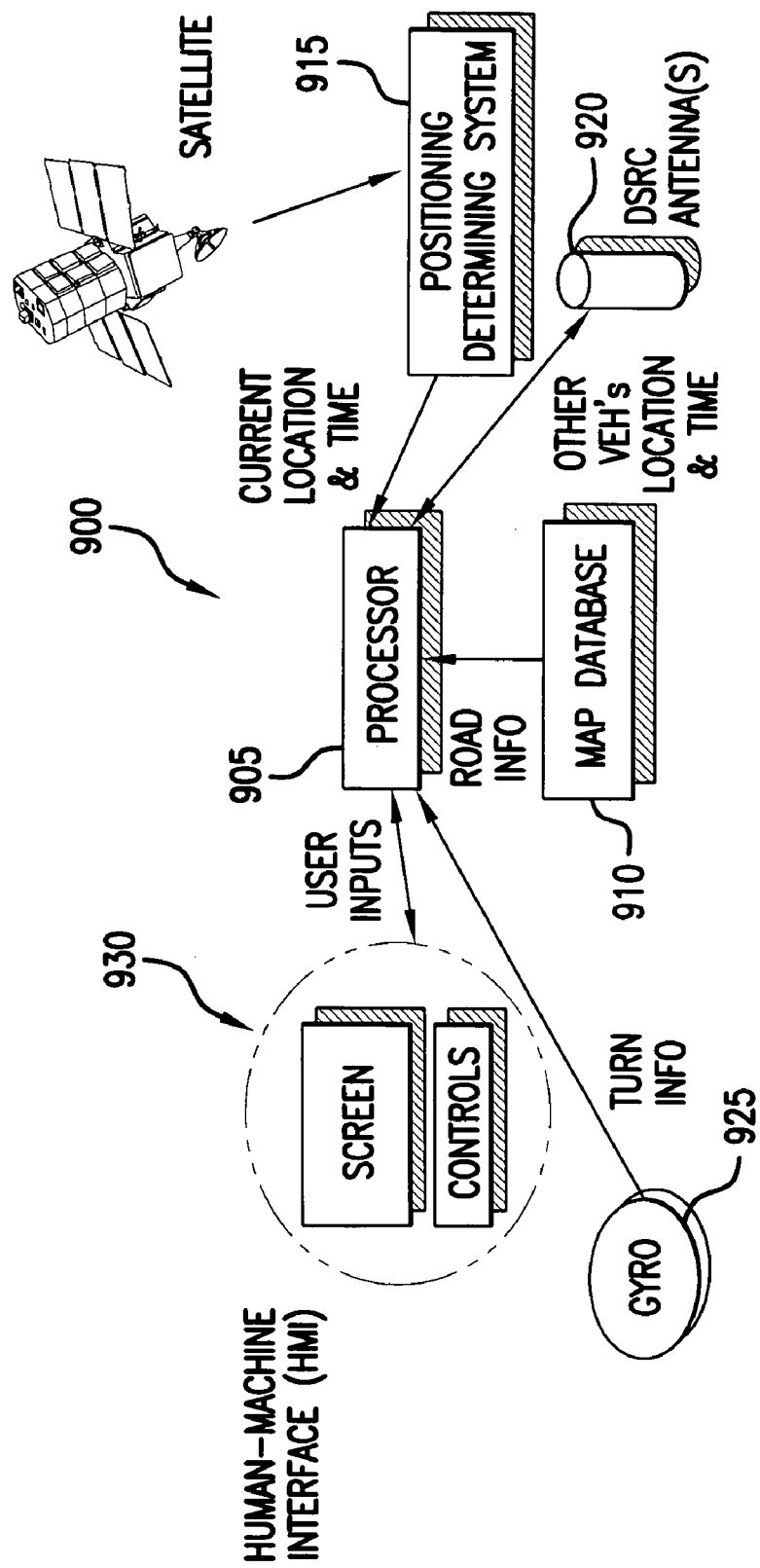
FIG. 9 is an exemplary system architecture implementing one embodiment of the present invention.

FIG. 9 is an exemplary system architecture implementing one embodiment of the present invention. An on-board unit (OBU) arranged on a vehicle includes a processor 905 which is connected to a map database 910 which contains road information. As would be recognized by those skilled in the art, this map database 910 may include all the required map information in local storage in the car or the processor may be programmed to communicate with an external repository (for example, using wireless communication or by reading a CD containing map information) to update the map information 910 on an as-needed basis. The processor 905 also communicates with a positioning determining system 915 to determine a current location and time of the vehicle. A satellite based GPS system receiver may be one embodiment of the positioning determining system 915. The processor also communicates with a DSRC antenna 920 that sends and receives information with other DSRC antennas mounted on other vehicles which are within a predetermined range of the DSRC antenna 920. In one embodiment, the DSRC antenna 920 sends and receives information to other DSRC antennas that are located within 1000 meters. Furthermore, the DSRC antennas located on the different vehicles communicate with each other using a communication protocol that can be implemented by different manufacturers of the DSRC equipment. The processor 905 also communicates with a gyro 925 that provides turn information. A human-machine interface 930 allows a user of the system to communicate with the processor 905. The human-machine interface 930 includes a display for displaying information and options to the user together with a console by which the user can provide input to the processor 930.

Furthermore, it should be recognized that the on-board unit (OBU) includes the necessary software (and/or firmware) for implementing the processing logic discussed herein. Accordingly, one skilled in the art would recognize that such software may be located in a memory associated with the processor while additional programs and data may even be stored in a database such as map database 910. In other words, the map database 910 may be a generic database that may contain other information in addition to the map information.

At the point of an established handshake, the system could preface all communication packets intended for entertainment systems with the intended vehicular ID's of interest. Upon a Key-Off/Key-On, the vehicle could ask the user if he/she would like to reestablish or cancel the handshake ("Resume Caravan?") so that the system need not rediscover vehicles in the area. If the user wished to cancel the caravan during normal operation, this should be accomplished by pressing either a discrete control with the Human Machine Interface (HMI) or a reconfigurable control (i.e. "softkey"). Temporary interruption of the communications (e.g. external barrier, out of range condition, weather-induced interference) should not cancel the caravan; the electronic handshake should remain active and simply await a reestablishment of the communications link.

Figure 10:
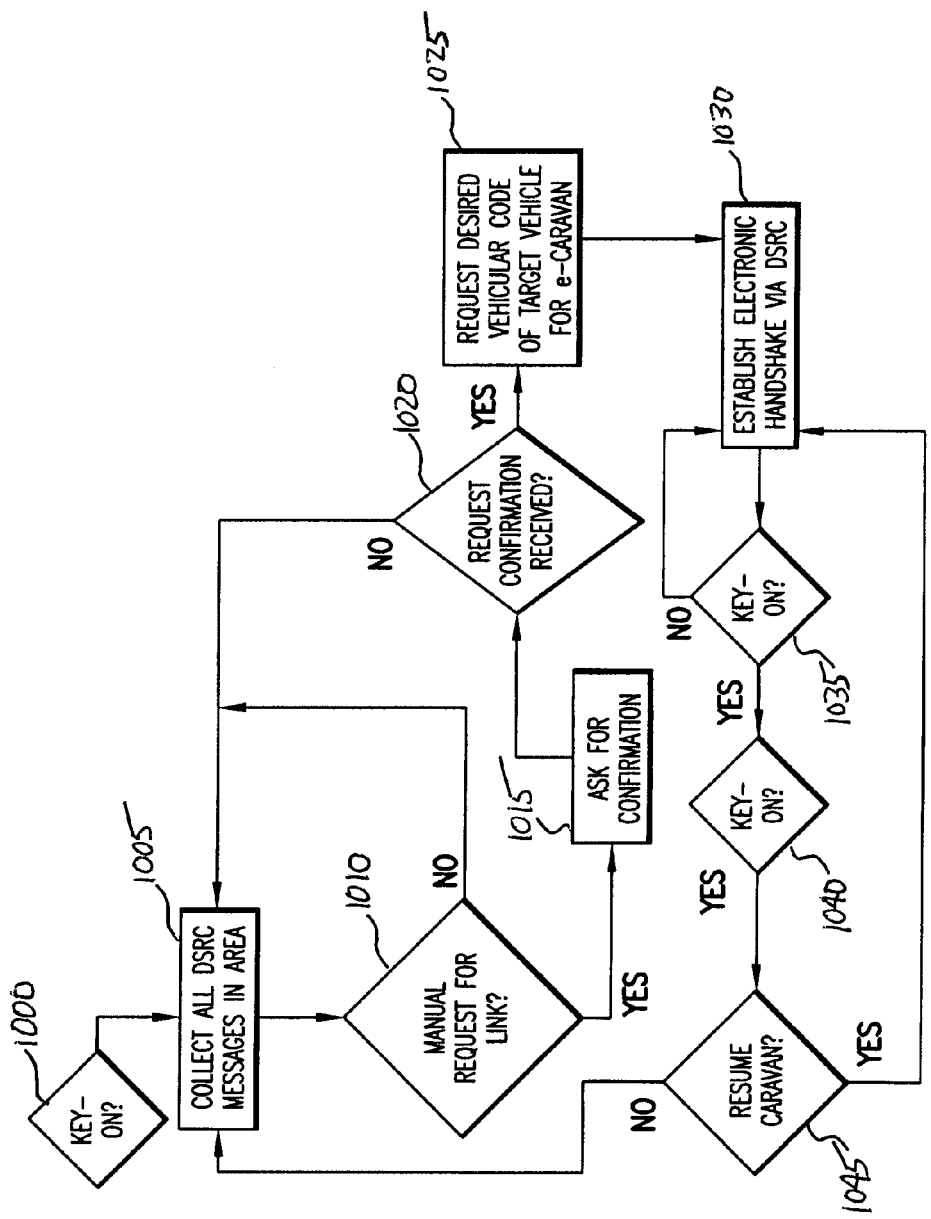
FIG. 10 is a flowchart illustrating a process flow of an exemplary manual resumption or initiation of inter vehicle communication.

One example of such a manual resumption or initiation of the caravan or inter vehicle communication by an OBU on a vehicle is disclosed in FIG. 10. Such a manual resumption of the caravan could be desired for a planned stop at a rest stop or other highway point of interest, for example. This would also prevent the complications resulting from multiple, smaller maneuvers at the beginning of a route or at a stoppage point. In step 1000 a key-on event is detected and all the DSRC messages that are in range are collected in step 1005. In step 1010, a check is made to see if there is a manual request for a link and if so, a confirmation is requested in step 1015. If confirmation of the request for a manual link is detected in step 1020, a request is made for a vehicle code or ID of the target vehicle with which to caravan. In step 1030, a handshake is established with the target vehicle. Thereafter, if there is a key-off and key-on sequence in steps 1035 and 1040, a check is made to see if the vehicle user or operator wishes to resume the caravan in step 1045 and if so, reestablishes handshake with the target vehicle in step 1030. If not, the process control returns to step 1005, in which the OBU determines which other vehicles are within range for DSRC communications.

Figure 11:
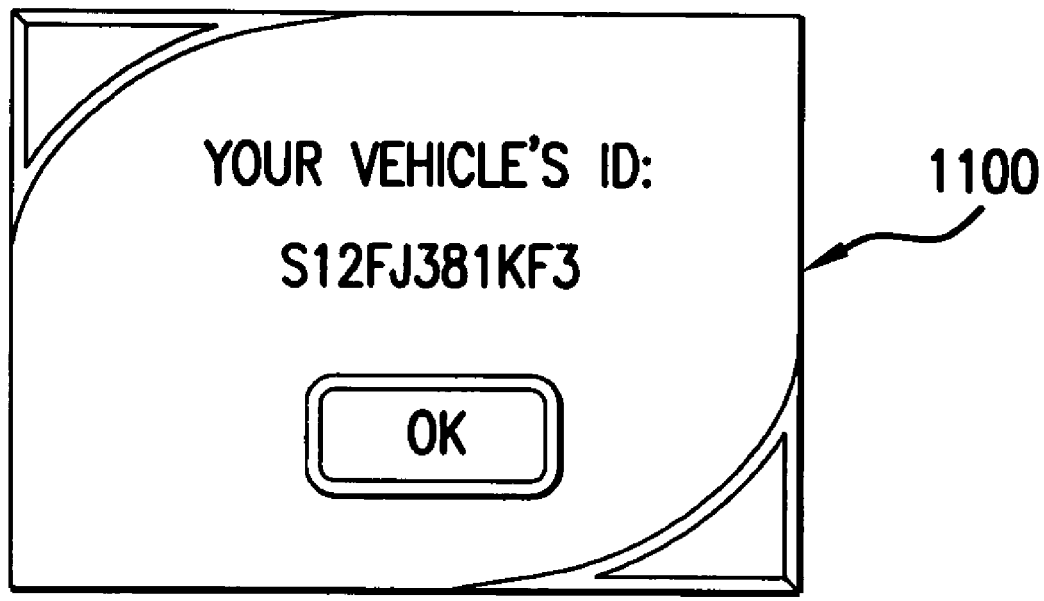
FIG. 11 provides one example of a display screen 1100 which displays a particular vehicle's ID to a user in the vehicle.

To facilitate the manually initiated handshake, as described in steps 1010-1030, the user must be provided the MAC (Media Access Control) address for his own vehicle, and must have the ability to either manually enter a known MAC within the caravan OR select from the MAC's detected in the local area. FIG. 11 provides one example of a display screen 1100 which displays a particular vehicle's ID to a user in the vehicle.

Since DSRC is intended to be first and foremost a safety-related technology, the system is designed to not interfere with any safety related communications. In order to ensure the reliability of such safety-related communications, the DSRC system would need to periodically switch back and forth from the Control Channel (i.e. safety-related "operator" channel akin to Channel 19 in CB broadcasting)

to the outlying channels where the caravan has been established. In the event of a safety-related situation identified by the DSRC processor, the handshake would be put on hold while the system remained at the control channel (and/or the designated, temporary channel for high-priority communications), and would reestablish the handshake after the imminent situation was clear. In one embodiment, the system could be provided with two antennas and two processors, such that the system could temporarily dedicate one antenna and processor set to the entertainment/navigational tasks while the other set continued to monitor the Control Channel.

Figure 12:
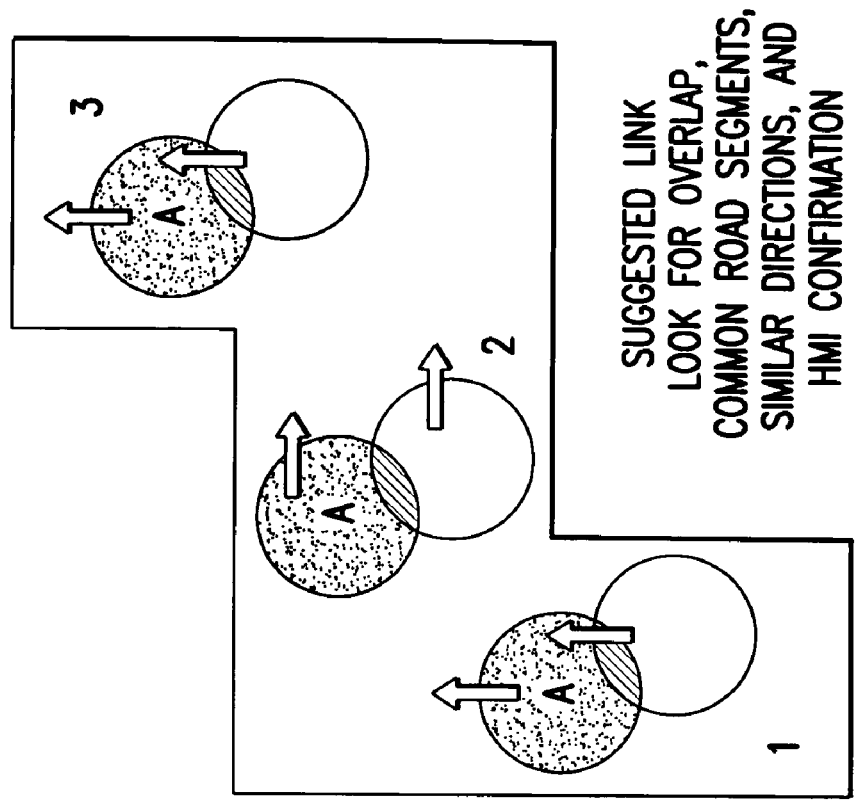
FIGS. 12 and 13 illustrate other embodiments in which one vehicle is able to determine other candidate vehicles for a caravan without using road segment information.
Figure 12:
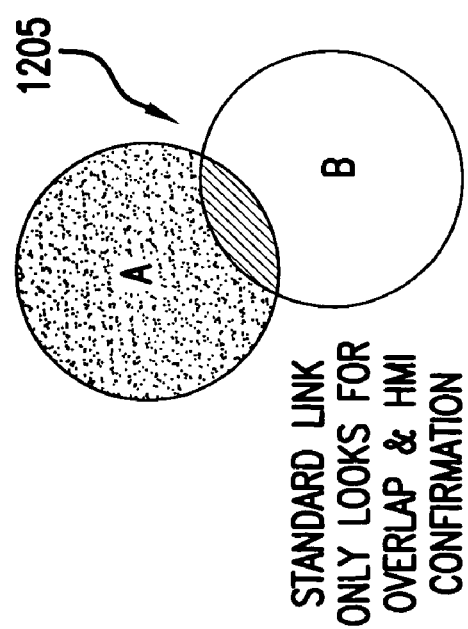
Figure 13:
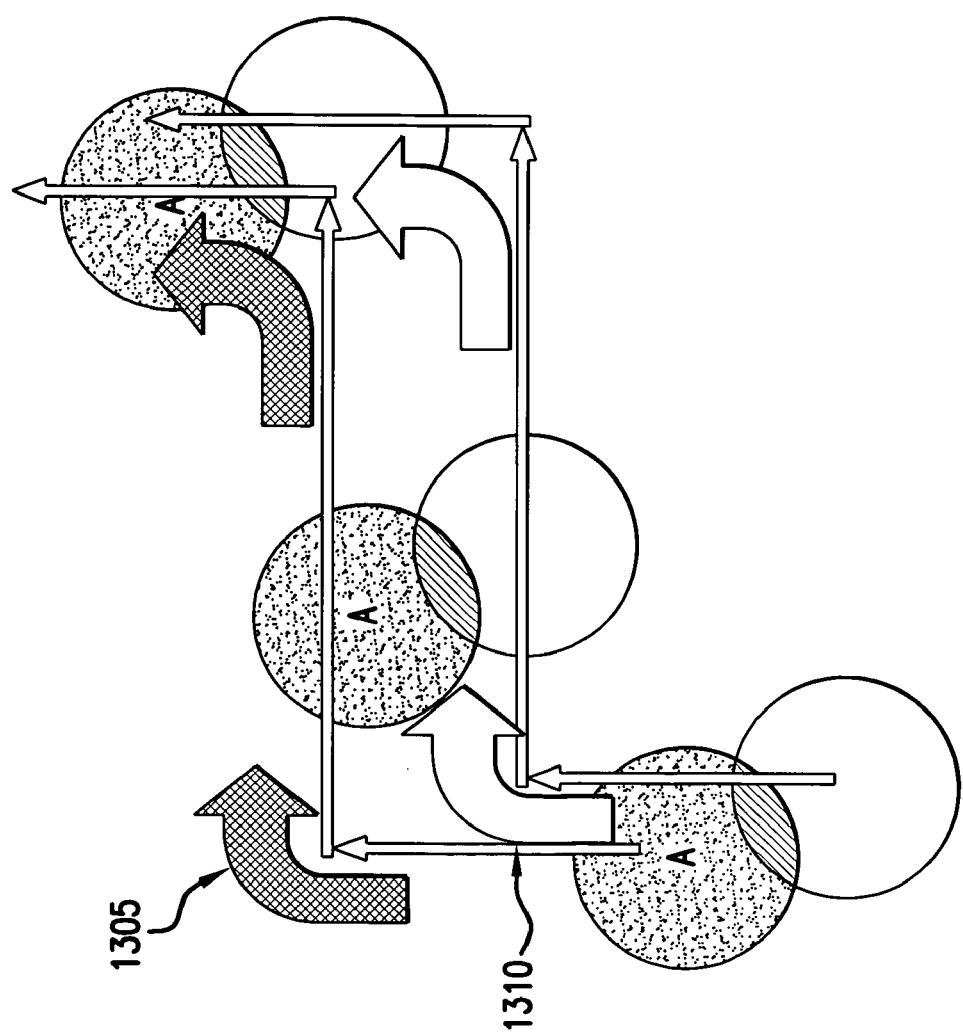

FIGS. 12 and 13 illustrate other embodiments in which one vehicle is able to determine other candidate vehicles for a caravan without using road segment information. As shown in FIG. 12, other candidate vehicles for a caravan could be determined based on an overlap in the DSRC communication ranges with the candidate vehicles. For example, if such an overlap 1205 is determined to exist for a certain duration or distance of travel, the candidate vehicle could be identified as a candidate for a caravan as discussed herein.

FIG. 13 shows another embodiment in which the travel vectors 1305 and 1310 of two vehicles could be used to determine whether the two vehicles are good candidates for a caravan. For example, if the two vectors 1305 and 1310 were in a parallel relationship or a following relationship (i.e., the two vectors remained parallel or were displaced with one leading the other) for a certain duration or distance, the two vehicles could be identified as candidates for a caravan as described herein.

Throughout this application, DSRC and GPS are mentioned as enabling technologies in certain embodiments. They may not, however, be the sole available implementations and it is to be understood that other "inter-vehicle communication" and "location-positioning" systems could be used instead of the DSRC and GPS technology with the methods and systems of the present application.

Furthermore, various-embodiments of the present invention contemplate methods, systems, and program products on any computer readable media for accomplishing its operations. Some embodiments of the present invention may be implemented using an existing computer processor, or by a special purpose computer processor configured for this or another purpose.

As noted above, embodiments within the scope of the present invention include program products on computer-readable media and carriers for carrying, or having computer-executable instructions or data structures stored thereon. Such computer-readable media can be any available media which can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer or processor, the computer or processor properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processor to perform a certain function or group of functions.

Some embodiments of the invention have been described in the general context of method steps which may be implemented, for example, by a program product including computer-executable instructions, such as program modules, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A method of automatically communicating with other vehicles, comprising:
   determining, by a first vehicle, whether other vehicles are within short range communication range of the first vehicle;
   filtering, by the first vehicle, of the other vehicles within short range communication range based on whether the other vehicles are traveling along a same travel path; and
   establishing communication with one or more of the other vehicles based on the filtering in the filtering step.

2. The method according to claim 1, wherein the determining step comprises determining other vehicles which are within range of Dedicated Shortwave Radio Communications (DSRC) communication for a period of time.

3. The method according to claim 2, wherein the filtering step comprises determining other vehicles which have a similar travel vector as the first vehicle.

4. The method according to claim 3, wherein the filtering step further comprises determining other vehicles which have a similar travel vector for at least a predetermined number of travel segments.

5. The method according to claim 4, wherein the predetermined number of travel segments is 3.

6. The method according to claim 3, wherein the first vehicle establishes handshake communication with one of the other vehicles and then waits for a second predetermined number of travel segments before beginning regular communications with the one of the other vehicles.

7. The method according to claim 3, wherein the similar travel vector is determined based on a predetermined maximum separation distance between the first vehicle and the other vehicles.

8. The method according to claim 3, wherein the similar travel vector is determined based on a change in position data of the first vehicle and the other vehicles.

9. The method according to claim 2, wherein the determining step comprises determining other vehicles which are within DSRC communication range on a moving basis based on a moving position of the first vehicle.

10. The method according to claim 9, wherein the determining step comprises determining other vehicles within DSRC communication range when an ignition switch of the first vehicle is in an on position.

11. The method according to claim 1, wherein the step of establishing communication comprises sending and receiving information at the first vehicle to or from one or more of the other vehicles.

12. The method according to claim 11, wherein the information comprises one or more of map information, game information, audio or video data streams, instant messaging information, and digital data files.

13. A system for a first vehicle to automatically communicate with other vehicles, comprising:
  a short range communication unit for the first vehicle to communicate with other vehicles which are within range of the short range communication unit associated with the first vehicle;
  a positioning determination system for determining a position of the first vehicle; and
  a control unit for filtering, by the first vehicle, of the other vehicles based on a distance of the other vehicles and whether the other vehicles are traveling along a same or similar travel path,
  wherein the short range communication unit establishes communication with one or more of the other vehicles filtered by the control unit.

14. The system according to claim 13, wherein the control unit determines whether the other vehicles are within range of Dedicated Shortwave Radio Communications (DSRC) communication for a period of time.

15. The system according to claim 14, wherein the control unit determines whether the other vehicles have a similar travel vector as the first vehicle.

16. The system according to claim 15, wherein the control unit determines which other vehicles have a similar travel vector as the first vehicle for at least a predetermined number of travel segments.

17. The system according to claim 16, wherein the predetermined number is 3.

18. The system according to claim 15, wherein the control unit establishes handshake communication with one of the other vehicles and then waits for a second predetermined number of travel segments before beginning regular communications with the one of the other vehicles.

19. The system according to claim 14, wherein the control unit determines whether other vehicles are within DSRC communication range only when an ignition switch is in an on position.

20. The system according to claim 15, wherein the control unit determines the similar travel vector based on a predetermined maximum separation distance between the first vehicle and the other vehicles.

21. The system according to claim 15, wherein the control unit determines the similar travel vector based on a change in position data of the first vehicle and the other vehicles.

22. The system according to claim 14, wherein the control unit determines whether the other vehicles are in range for DSRC communication on a moving basis based on a moving position of the first vehicle.

23. The system according to claim 13, wherein the control unit establishes communication with the one or more of the other vehicles to send and receive information to and from the one or more of the other vehicles.

24. The system according to claim 23, wherein the information comprises one or more of map information, game information, audio or video data streams, instant messaging information, and digital data files.

25. The system according to claim 13, wherein the short range communication unit comprises a radio communication unit.

26. A system for a first vehicle to automatically communicate with other vehicles, comprising:
  short range communication means for the first vehicle to communicate with other vehicles which are within range of the short range communication means associated with the first vehicle;
  means for determining a position of the first vehicle; and
  a control means for filtering, by the first vehicle, of the other vehicles based on a distance of the other vehicles and whether the other vehicles are traveling along a same or similar travel path,
  wherein the short range communication means establishes communication with one or more of the other vehicles filtered by the control means.

27. A system for a first vehicle to communicate with other vehicles comprising:
  short range communication means for the first vehicle to communicate with other vehicles which are within range of short range communication means associated with the first vehicle;
  means for manually inputting a vehicle ID of a second vehicle with which the first vehicle desires to communicate, and
  wherein the short range communication means establishes communication with the second vehicle based on the vehicle ID inputted in the first vehicle.

* * * * *